(12) United States Patent
Watanabe (10) Patent No.: US 6,256,517 B1
(45) Date of Patent: *Jul. 3, 2001

(54) COMMUNICATION DEVICE WITH POWER RESTRICTION (75) Inventor: Kazunari Watanabe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/635,041

(22) Filed: Apr. 19, 1996

Related U.S. Application Data (63) Continuation of application No. 08/141,475, filed on Oct. 22, 1993, now abandoned.

(30) Foreign Application Priority Data

Nov. 13, 1992 (JP) .................................................. 4-328555

(51) Int. Cl.[7] ...................................................... H04Q 7/20
(52) U.S. Cl. .......................... 455/566; 455/464; 455/550; 455/567
(58) Field of Search ................................. 379/58, 59, 61, 379/376, 396; 455/33.1, 38.3, 127, 343, 54.1, 154.2, 157.2, 158.2, 158.4, 158.5, 566, 567, 574, 550, 462, 464, 564, 463

(56) References Cited

U.S. PATENT DOCUMENTS

| | | | |
|---|---|---|---|
| 4,220,820 | * 9/1980 | Mallien, II | ............................ 455/564 |
| 4,965,849 | * 10/1990 | Kunihiro | ............................... 455/464 |
| 4,982,424 | * 1/1991 | Saito et al. . | |
| 5,010,566 | * 4/1991 | Seo | ......................................... 379/61 |
| 5,099,508 | * 3/1992 | Inaba . | |
| 5,175,759 | * 12/1992 | Metroka et al. | ........................ 379/58 |
| 5,204,986 | * 4/1993 | Ito et al. | ............................... 455/343 |
| 5,285,493 | * 2/1994 | Wagai et al. | ........................... 379/58 |
| 5,363,430 | * 11/1994 | Yamagata et al. | ...................... 379/61 |
| 5,379,319 | * 1/1995 | Satoh et al. | ............................. 379/61 |

FOREIGN PATENT DOCUMENTS

| | | | |
|---|---|---|---|
| 159131 | * 10/1982 | (JP) | ..................................... 455/127 |
| 2239725 | * 10/1987 | (JP) . | |
| 1248792 | * 10/1989 | (JP) . | |
| 2100447 | * 4/1990 | (JP) . | |
| 2155394 | * 6/1990 | (JP) | .................................... 455/38.3 |
| 3-205927 | * 12/1991 | (JP) . | |
| 5102910 | * 4/1993 | (JP) . | |
| 5344022 | * 12/1993 | (JP) | ..................................... 455/343 |

OTHER PUBLICATIONS

"Newton's Telecom Dictionary", 8th Ed., Harry Newton, pp. 195, 730, Nov. 1994.*

* cited by examiner

Primary Examiner—Nay Maung
(74) Attorney, Agent, or Firm—Fitzpatrick, Cella, Harper & Scinto (57) ABSTRACT A telephone has a speech detection circuit connected to a microphone so that an external line lamp is turned off when a transmitting signal is detected by the speech detection circuit or when a dial key is pressed. When a hold key is pressed, power for a transmission section is turned off while power for a receiving section is turned on. The power for the transmission section is turned on in response to key input or receiving of a control signal.

55 Claims, 9 Drawing Sheets

COMMUNICATION DEVICE WITH POWER RESTRICTION

This application is a continuation, of application Ser. No. 08/141,475 filed Oct. 22, 1993 now abandoned.

BACKGROUND OF THE INVENTION

1. Field of the Invention

The present invention relates to a telephone having a display.

2. Description of the Related Art

A communication device such as a telephone or the like frequently has a display. However, the display is operated even when the user has no need to see the display, and thus electric power is uselessly consumed.

Considering this problem, a telephone has been proposed in which a back light of a display indicating a calling dial number and so on is turned off if no key input is performed for a predetermined time.

Figure 9:
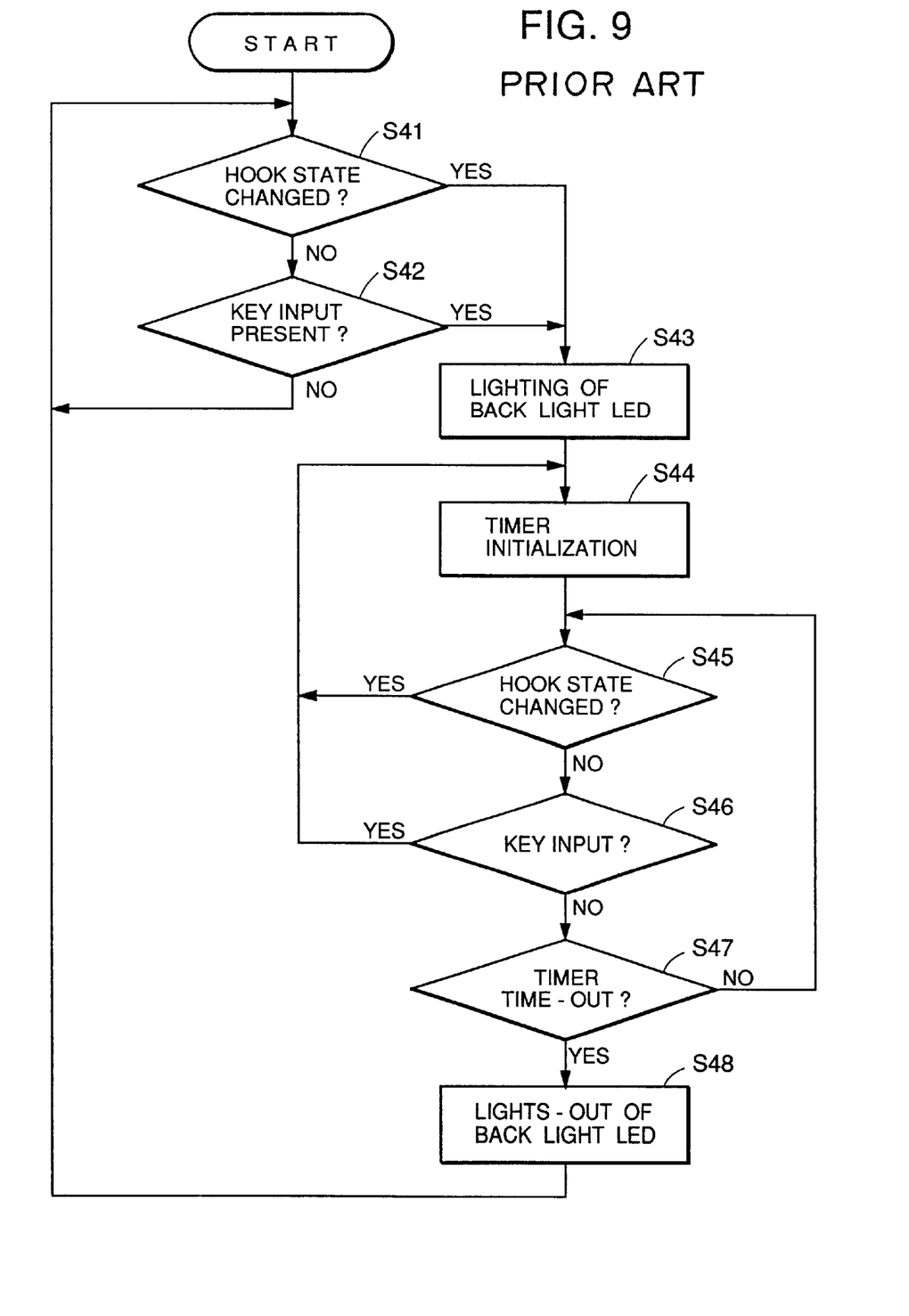
FIG. 9 is a flowchart illustrating related art.

In this telephone, as shown in FIG. 9, it is checked whether or not by the ten key pad or a function key are operated, and whether or not the hook state is changed, i.e., whether or not the on-hook state is changed to the off-hook state, or vice versa (Steps S41 and 42). At this time the backlight LED (Light Emitting Diode) is turned off. This check is continued until key input is performed, or the hook state is changed. If key input is performed, or if the hook state is changed, the LED is lighted (Step S43). At the time of a call, the flow also goes to Step S43.

A timer then starts to count (Step S44). A check is then made as to whether or not the hook state is changed (Step S45) and whether or not key input is performed (Step S46). When either a change in the hook state or key input is detected, the timer is initialized (Step S44). A check is made again as to whether or not the hook state is changed (Step S45) or whether or not key input is performed (Step S46), and the above operation is repeated. When the hook state is not changed (S45) or key input is not performed (S46) for a predetermined time, the timer assumes the time-out state (Step S47), and the back light LED is turned off (Step S48). The flow then returns to the initial state (Step S40), and the above operation is repeated.

However, when the back light LED is to be turned off at the time the count value of the timer reaches a predetermined value, as described above, it is difficult to set an appropriate value for the timer because of differences in preferred values among operators.

In addition, since the display time depends upon the display contents, it is sometimes unsuitable to turn off the back light LED in the time-out state of the timer.

SUMMARY OF THE INVENTION

It is an object of the present invention to save power consumption without affecting operability.

It is another object of the present invention to save electric power consumed in holding.

It is till another object of the present invention to provide a telephone in which the electric power consumed by a display is restricted, or the display is turned off when transmitted speech or key input is detected.

It is a further object of the present invention to provide a communication device in which the transmission of a carrier signal is stopped in response to a demand for holding.

The invention is directed to a communication device with a display in which a transmitting signal is detected. The power to the display is controlled according to the detection.

According to an aspect of the invention, the communication device transmits the transmitting signal and a carrier signal. The transmission of the transmitting signal and the carrier signal are controlled according to an input to a key pad of the device.

Other objects of the present invention will be obvious from the description of preferred embodiments below.

DETAILED DESCRIPTION OF THE PREFERRED EMBODIMENTS

Figure 1:
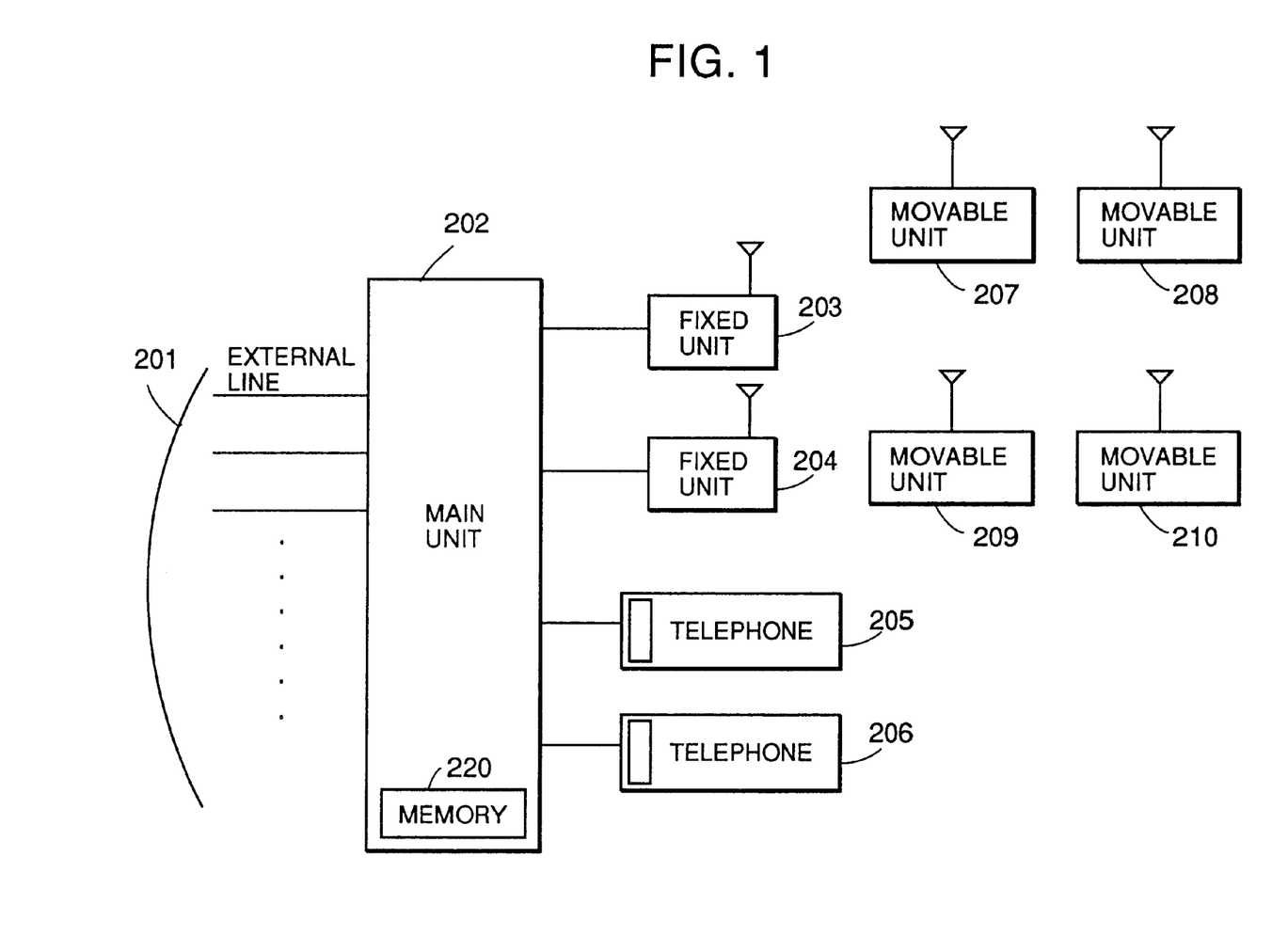
FIG. 1 is a drawing showing the configuration of a system in accordance with an embodiment of the present invention.

FIG. 1 shows the configuration of a cordless telephone system to which the present invention is applied. In FIG. 1, reference numeral 202 denotes a main unit (control equipment) to which a plurality of external lines 201, fixed units 203 and 204 and extension telephones 205 and 206 are connected. The main unit 202 stores each of the states (free, speaking, calling, holding and so on) of the plurality of external lines 201 in a memory 220.

The fixed units 203 and 204 are connected to the movable units 207 to 210 by radio.

Figure 2:
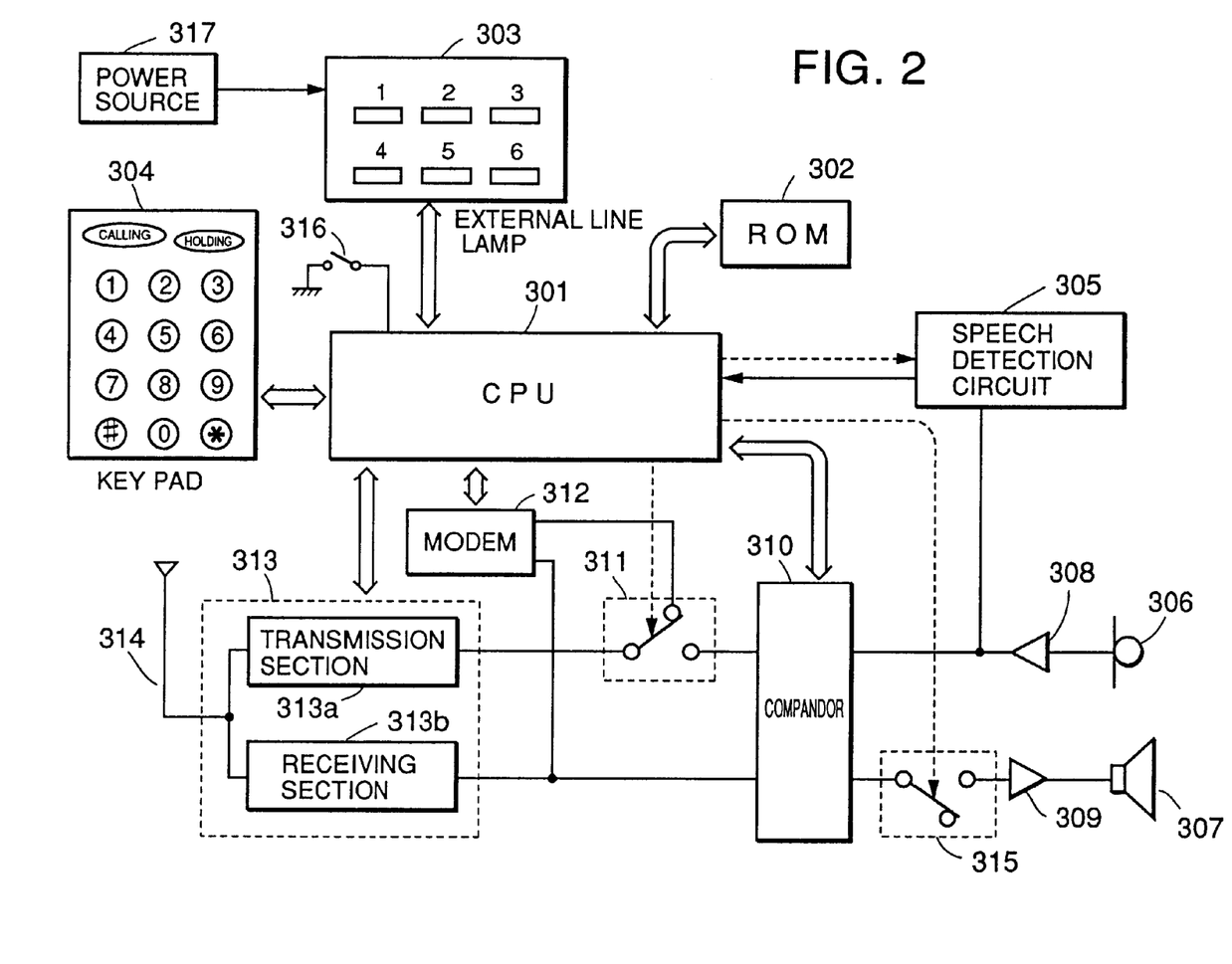
FIG. 2 is a block diagram of a movable unit in accordance with a first embodiment of the present invention.

FIG. 2 is a block diagram illustrating the configuration of a movable unit in accordance with a first embodiment of the present invention.

In calling through an external line, when it is recognized that a calling key of a key pad 304 is pressed, or that a movable unit is lifted from a charging base and a switch 316 is turned off, a CPU 301 sets a switch 311 to the side of a modem 312, grounds a mute switch 315 and turns a transmitting/receiving section 313 on. The CPU 301 also sets a transmission/receiving channel and reads an ID (identification) code from a ROM 302.

The modem 312 modulates a digital signal from the CPU 301 by FSK (Frequency Shift Keying) and sends the modulated signal to a transmission section 313a. The transmission section 313a performs FM (frequency modulation) of the received signal, and then sends a call signal to a fixed unit from an antenna 314 through a set control channel.

On the other hand, the control signal transmitted from the fixed unit is received by the antenna 314, is demodulated to a FSK signal by a receiving section 313b, converted into a digital signal by the modem 312 and is then input to the CPU 310.

When the ID code of the control signal transmitted from the fixed unit agrees with the ID code previously stored in the ROM 302, the CPU 301 sends a response signal and continues radio connection. When both ID codes are different, it is decided that an error has occurred, and the radio connection is interrupted.

After the radio connection is completed, information about the state of the external line used which is transmitted from the main unit 202 through the fixed unit is input to the CPU 301. The CPU 301 controls an external line lamp 303 so that the lamp of the external line being used is lit in red, and the external line which receives a call is lit in green.

A dial signal is transmitted to the fixed unit from the keys of the key pad 304 through the CPU 301, the modem 312, the transmission section 313a and the antenna 314.

In a speaking state, the CPU 301 sets the switch 311 to the side of the compandor 310, and sets the mute switch 315 to the side of a speaker 307. The speech signal from the fixed unit is received by the antenna 314, demodulated to be an analog signal by the receiving section 313b, input to the mute switch 315 through an expander in the compandor 310, amplified by a speaker amplifier 309 and then output from the speaker 307.

The speech signal input to a microphone 306 is amplified by a microphone amplifier 308. The amplified speech signal is input to the transmission section 313a through a compressor in the compandor 310 and the compressed signal is subjected to FM modulation therein. The FM modulated signal is then transmitted to the fixed unit from the antenna 314.

A speech detection circuit 305 is connected to the output terminal of the microphone amplifier 308 to detect the input of a speech signal at a level higher than a predetermined level from the microphone 306 and to inform the CPU 301 of the detection of such a speech signal. The CPU 301 controls the operation state of the speech detection circuit 305 so as to operate the speech detection circuit 305 in a specified case during lighting of the external line lamp 303.

Figure 3:
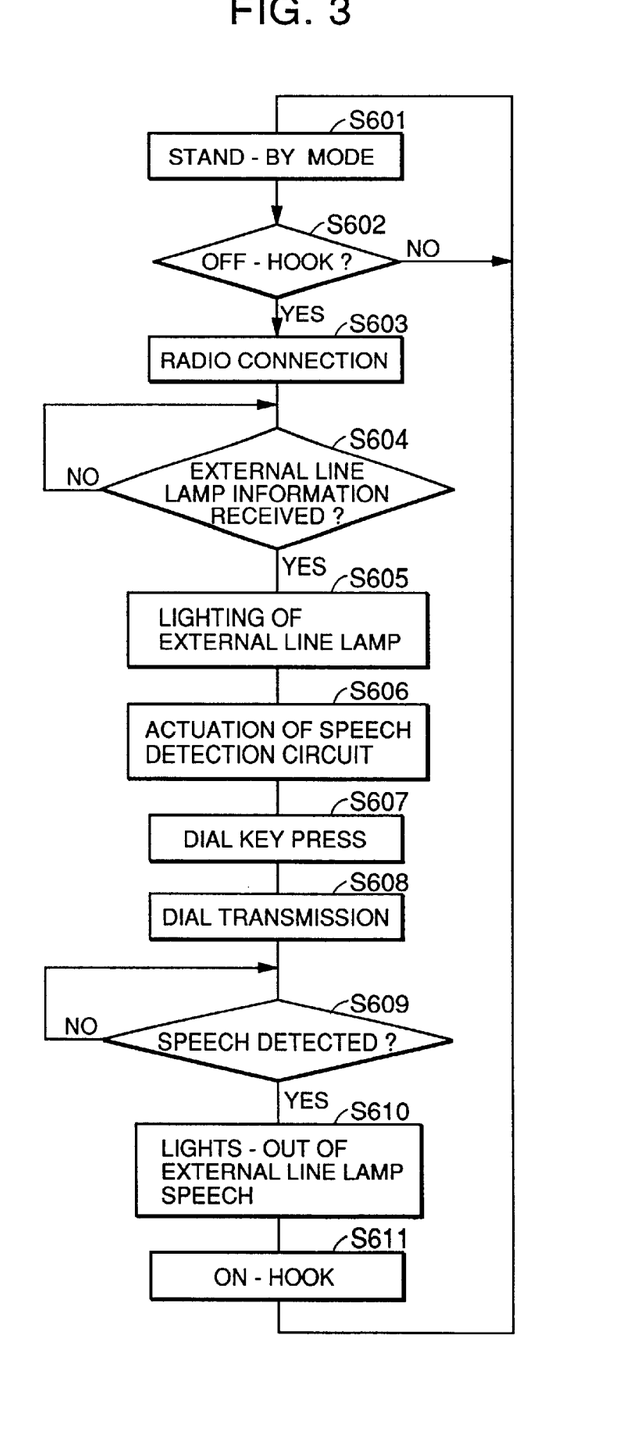
FIG. 3 is a flowchart illustrating a call-out operation of a movable unit in accordance with the first embodiment of the present invention.

FIG. 3 is a flowchart depicting the call-out operation, over an external line, of a movable unit in accordance with the first embodiment of the present invention shown in FIG. 2.

In Step S601, the movable unit is in a standby mode in which the CPU 301 waits until the calling key is pressed and a call signal is received from the fixed unit.

In the standby mode, when the user of the movable unit off hooks the movable unit to call over an external line, the CPU 301 of the movable unit detects the off-hook on the basis of pressing of the calling key of the key pad 304 or turning-off of the switch 316 in Step S602, and transmits a call signal to the fixed unit through the control channel in Step S603. The channel is then moved to the speaking channel specified by the fixed unit, and the CPU 301 transmits and receives the control signal to and from the fixed unit through the speaking channel to connect the movable unit and the fixed unit by radio.

The radio connection with the fixed unit is then completed and the CPU 301 of the movable unit receives display information of the external line lamp 303 over the speaking channel from the main unit 202 through the fixed unit in Step S604. The CPU 301 controls the external line lamp 303 supplied by a power source (not 317) on the basis of the display information received so as to indicate the present state of the external line used in the system in Step S605.

After display by the external line lamp 303, the CPU 301 operates the speech detection circuit 305 to monitor input of a speech signal by the user in Step S606.

When the dial key of the key pad 304 is pressed by the user after display by the external line lamp 303 in Step S605, the CPU 301 recognizes the dial number obtained by pressing the dial key in Step S607, and transmits the dial number to an external line through the fixed unit in Step S608.

The speaking state is then started by off-hook at the destination to which the dial number is transmitted. When the first speech of the user is detected by the speech detection circuit 305 in Step S609, the CPU 301 turns off the display of the external line lamp 303 in Step S610.

After talking is terminated, the CPU 301 detects the user going on-hook on the basis of pressing of the calling key on the key pad 304 or turn on of the switch 316 in Step S611. After the radio connection with the fixed unit is cut off, the flow returns to the standby mode (S601).

Figure 4:
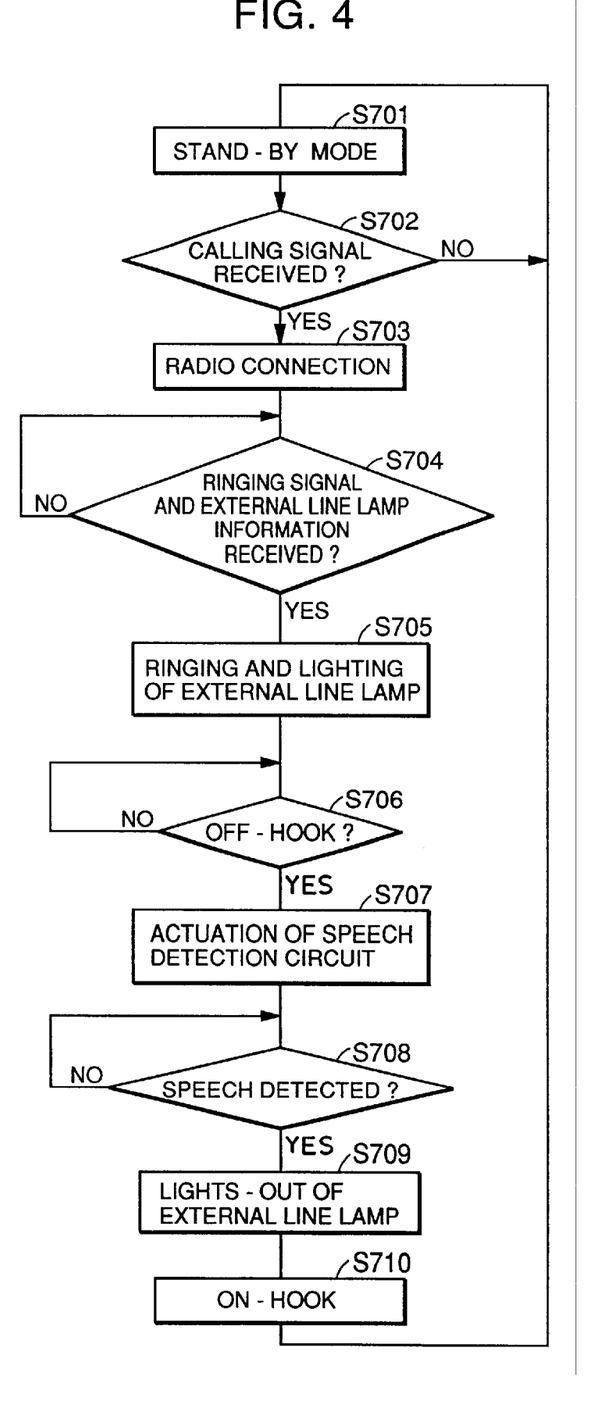
FIG. 4 is a flowchart illustrating a call-in operation of the movable unit in accordance with the first embodiment of the present invention.

FIG. 4 is a flowchart showing the call-in operation, through an external line, of the movable unit in accordance with the first embodiment of the present invention shown in FIG. 2.

In Step S701, the movable unit is in the standby mode in which the movable unit waits until the calling key on the key pad 304 is pressed and a call signal is received from the fixed unit.

When the above system receives a call through the external line, the movable unit receives the call signal transmitted from the fixed unit through the control channel in Step S702. In Step S703, the transmission/reception channel is moved to the speaking channel specified by the fixed unit, and the control signal is transmitted and received to and from the fixed unit through the speaking channel to complete the radio connection.

After the radio connection between the movable unit and the fixed unit is completed, a ringing signal and display information of the external line lamp indicating the state of the external line used by the system are transmitted to the movable unit from the main unit 202 through the fixed unit. The CPU of the movable unit receives these signals in Step S704, rings the movable unit and controls the external line lamp 303 so that display is performed in accordance with the received display information of the external line lamp.

When off-hook by the user is detected in response to ringing of the movable unit on the basis of pressing of the calling key on the key pad 304 or turning off of the switch 316 in Step S706, the speaking state is actuated in Step S707 and, at the same time, the CPU 301 operates the speech detection circuit 305. When the first speech of the user is recognized by the speech detection circuit 305 in Step S708, the CPU 301 turns off the display of the external line lamp 303 in Step S709.

After the speaking is terminated, the CPU 301 detects on-hook by the user on the basis of pressing of the calling key on the key pad 304 or turning on of the switch 316 in Step S710. After the radio connection between the fixed unit and the movable unit is cut off, the flow returns to the standby mode (Step S701).

The speech detection circuit may be provided on a fixed unit rather than on the movable unit so that the fixed unit detects a speech transmitted from a movable unit and transmits instructions to the movable unit to turn the external line lamp off.

Alternatively, the speech detection circuit 305 may be provided on the extension telephones 205 and 206 so that the display of each of the extension telephones 205 and 206 is turned off in response to the detection of speech transmitted by each of the extension telephones 205 and 206.

The amount of light of the external line lamp may be decreased by restricting the power to the external lamp in place of lights-out thereof.

Figure 5:
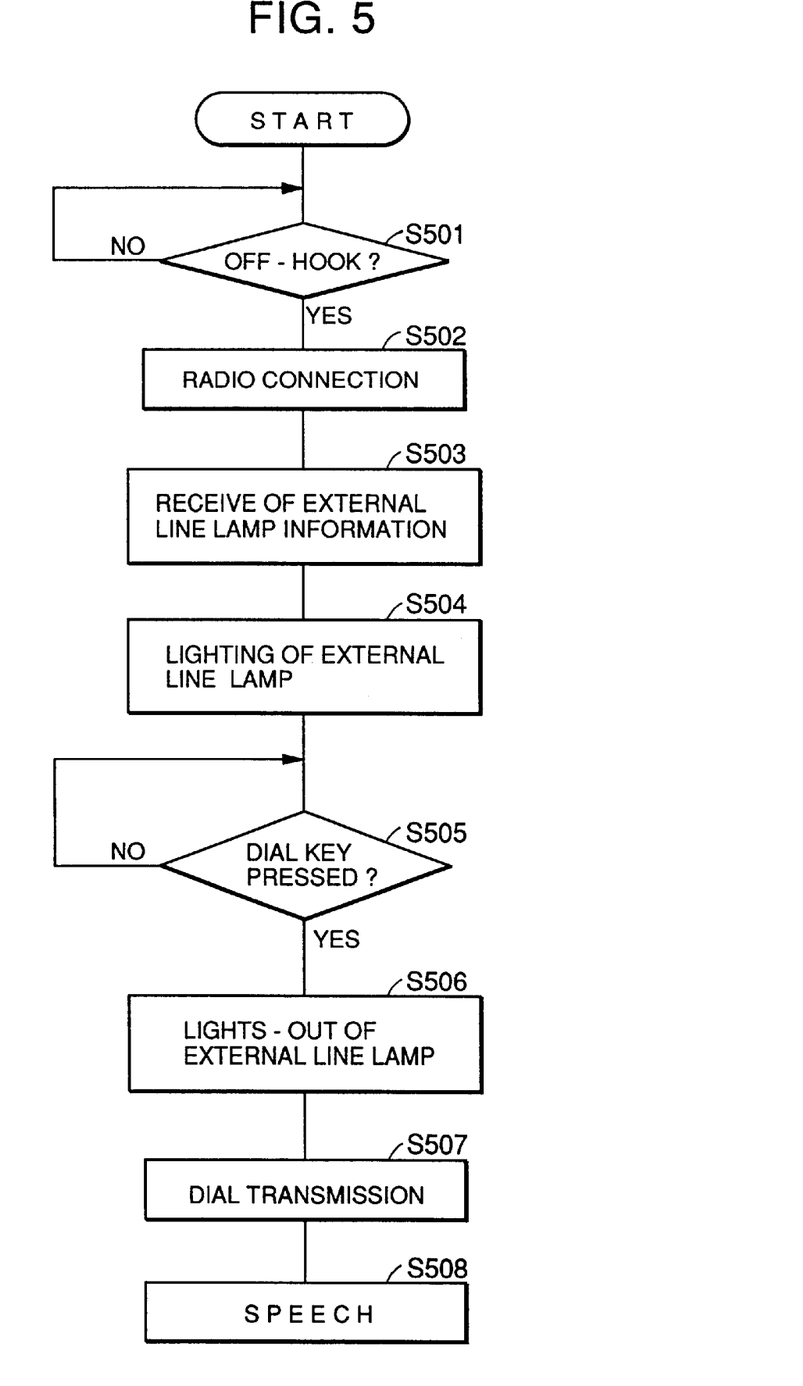
FIG. 5 is a flowchart illustrating a call-out operation of a movable unit in accordance with a second embodiment of the present invention.

FIG. 5 is a flowchart showing the operation of a movable unit in accordance with a second embodiment of the present invention. The configuration of a system of this embodiment is the same as that shown in FIG. 1, and the configuration of the movable unit is the same as that shown in FIG. 2 except that the speech detection circuit 305 is removed.

When off-hook is detected in the on-state of the power source (Step S501), the movable unit decides whether a call is made through an internal line or an external line, transmits a control signal containing information about the call to the fixed unit and makes radio connection therewith (Step S502).

The fixed unit informs the main unit 202 of off-hook of the movable unit, receives information about the state of the external line used from the main unit 202 and transmits display information of the external line lamp to the movable unit.

When the CPU 301 of the movable unit receives the display information of the external line lamp (Step S503), the CPU 301 controls the external line lamp 303 to light the lamp to inform the user of the receiving of a call by an external line and the state of the external line used.

The CPU 301 of the movable unit monitors the key pad 304 to see if the dial key is pressed by the user after the external line lamp is lighted (Step S505), and continuously lights the external line lamp until the dial key is pressed.

When the dial key is pressed by the user, the CPU 301 of the movable unit turns the external line lamp off (Step S506), and then transmits the dial data obtained to the fixed unit by pressing the dial key (Step S507).

When the fixed unit receives the dial data from the movable unit, the fixed unit sends the data to the main unit 202. The main unit 202 which receives the data dials to call the other party through an external line. Off-hook at the other party brings the movable unit into the speaking state through the main unit 202 and the fixed unit (Step S508).

In Step S506 shown in FIG. 5, the fixed unit which receives the dial data transmitted may send instructions to the movable unit to turn off the external line lamp in place of lights-out of the external line lamp by the CPU 301 of the movable unit, and the CPU 301 of the movable unit may turn off the external line lamp in response to the received instructions.

Alternatively, the external line lamp may be turned off in each of the extension telephones 205 and 206 when the dial key is pressed, or the amount of light of the external line lamp may be decreased by restricting power thereto in place of lights-out of the lamp.

Figure 6:
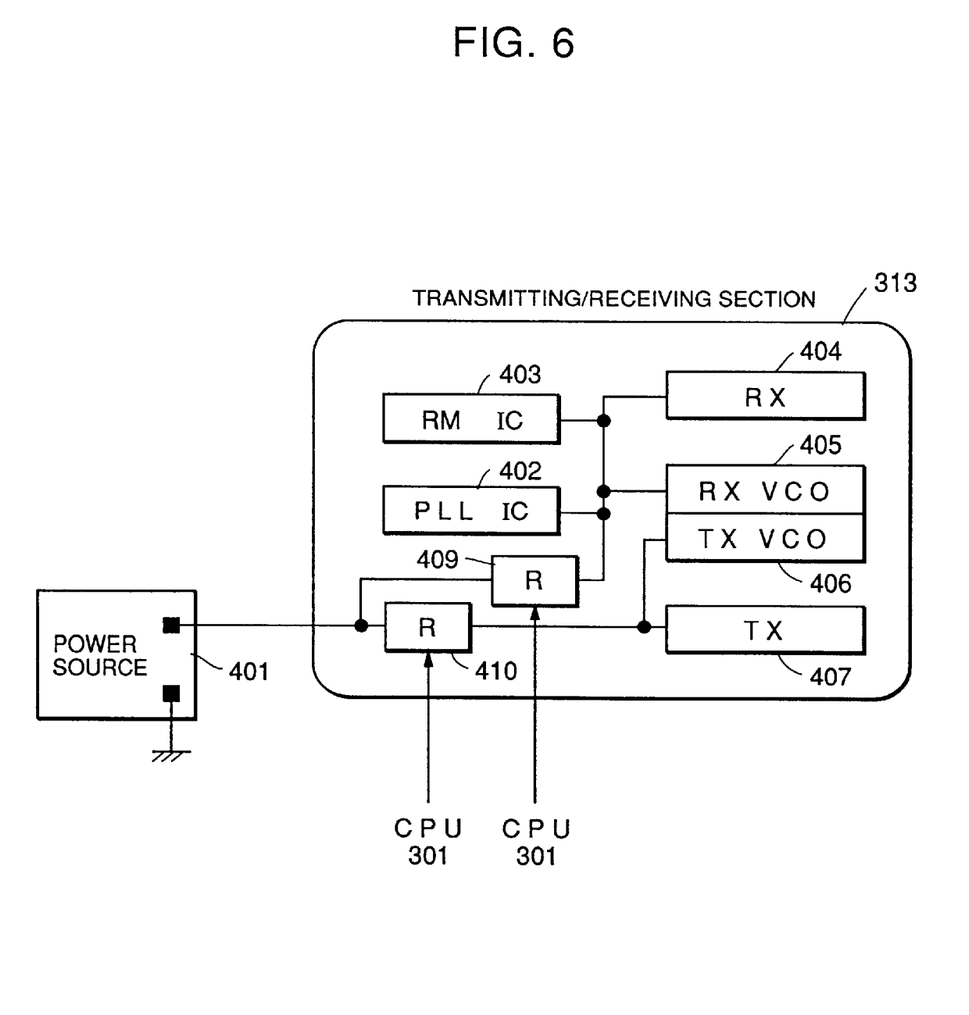
FIG. 6 is a block diagram of a transmitting/receiving section of a movable unit in accordance with a third embodiment of the present invention.

FIG. 6 is a block diagram illustrating, by connection of power supply lines, the configuration of the transmitting/receiving section 313 of a movable unit in accordance with a third embodiment of the present invention. The configuration of a system of this embodiment is the same as that shown in FIG. 1. The components of the movable unit of FIG. 1 except the transmitting/receiving section 313 are the same as those shown in FIG. 2 with the exception that the speech detection circuit 305 of FIG. 1 is removed.

Power is supplied to the transmitting/receiving section 313 of the movable unit from a battery 401 which may also supply power to the external lamp 303. The power supplied from the battery 401 is divided into two parts in the transmitting/receiving section 313 which are respectively connected to regulator ICs 409 and 410.

The regulator ICs 409 and 410 supply constant voltages to the transmitting/receiving section 313 and control turn on and turn off of the power by control of the CPU 301 of the movable unit.

The regulator IC 410 supplies power to a transmission oscillator 406 and a transmission amplifier 407. The regulator IC 409 supplies power to a PLL-IC 402, a RM receiving IC 403, a receiving section 404, a receiving oscillator 405 and so on.

In the speaking state, the regulator ICs 409 and 410 both supply power to the whole transmitting/receiving section 313.

In the holding state, the regulator IC 410 stops the power supply to the transmission amplifier 407 and the transmission oscillator 406 from the power source 401 so that no electric wave is transmitted from the movable unit.

In the system of the third embodiment configured as described above, if the movable unit 207 is connected to the fixed unit 203 by radio, and if the station line and the movable unit 207 are in the speaking state, the holding state is actuated by pressing the holding key of the movable unit 207. The operation up to the step in which the speaking state is actuated again is described below.

Figure 7:
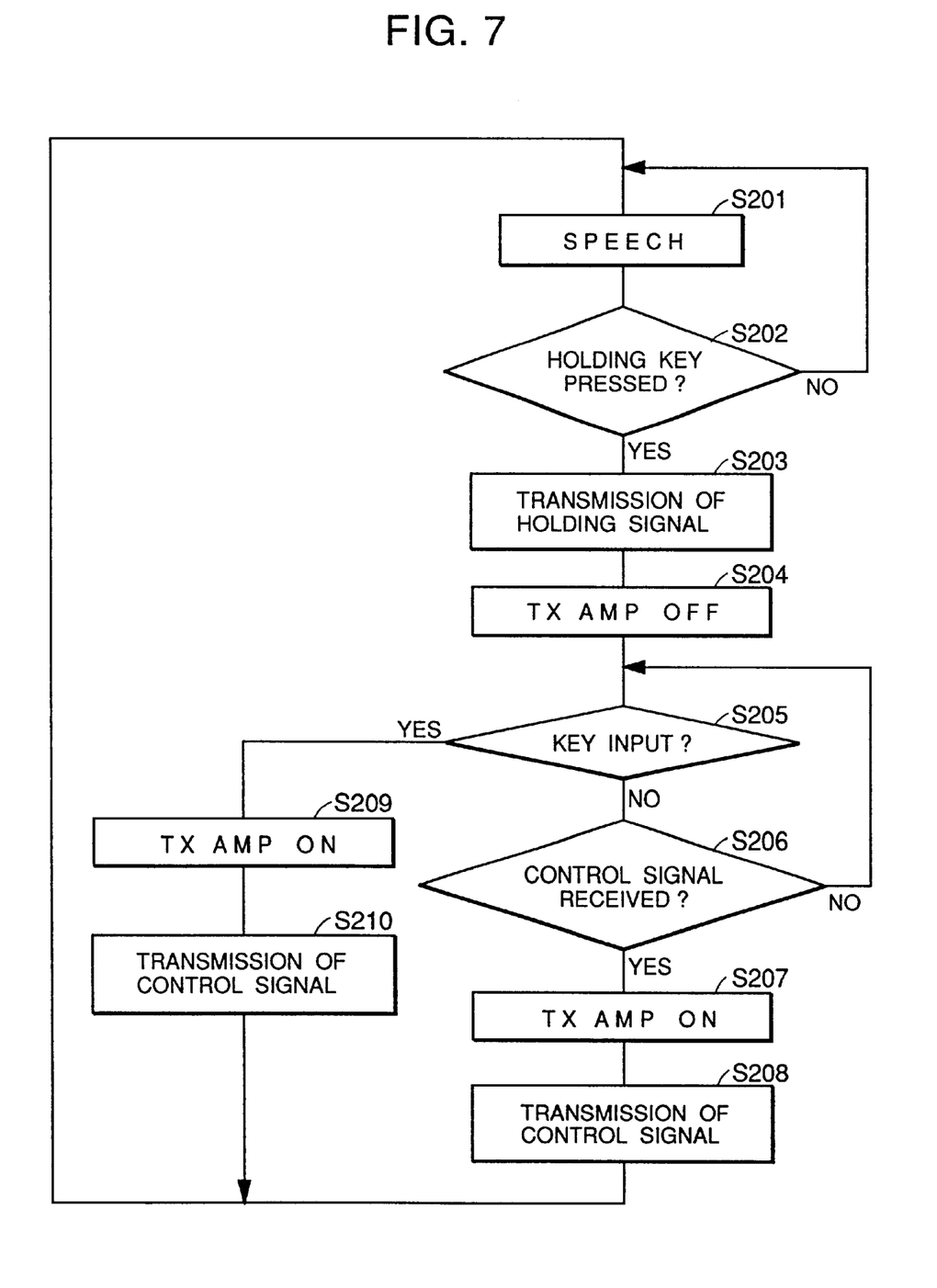
FIG. 7 is a flowchart illustrating operation of the movable unit in accordance with the third embodiment of the present invention.
Figure 8:
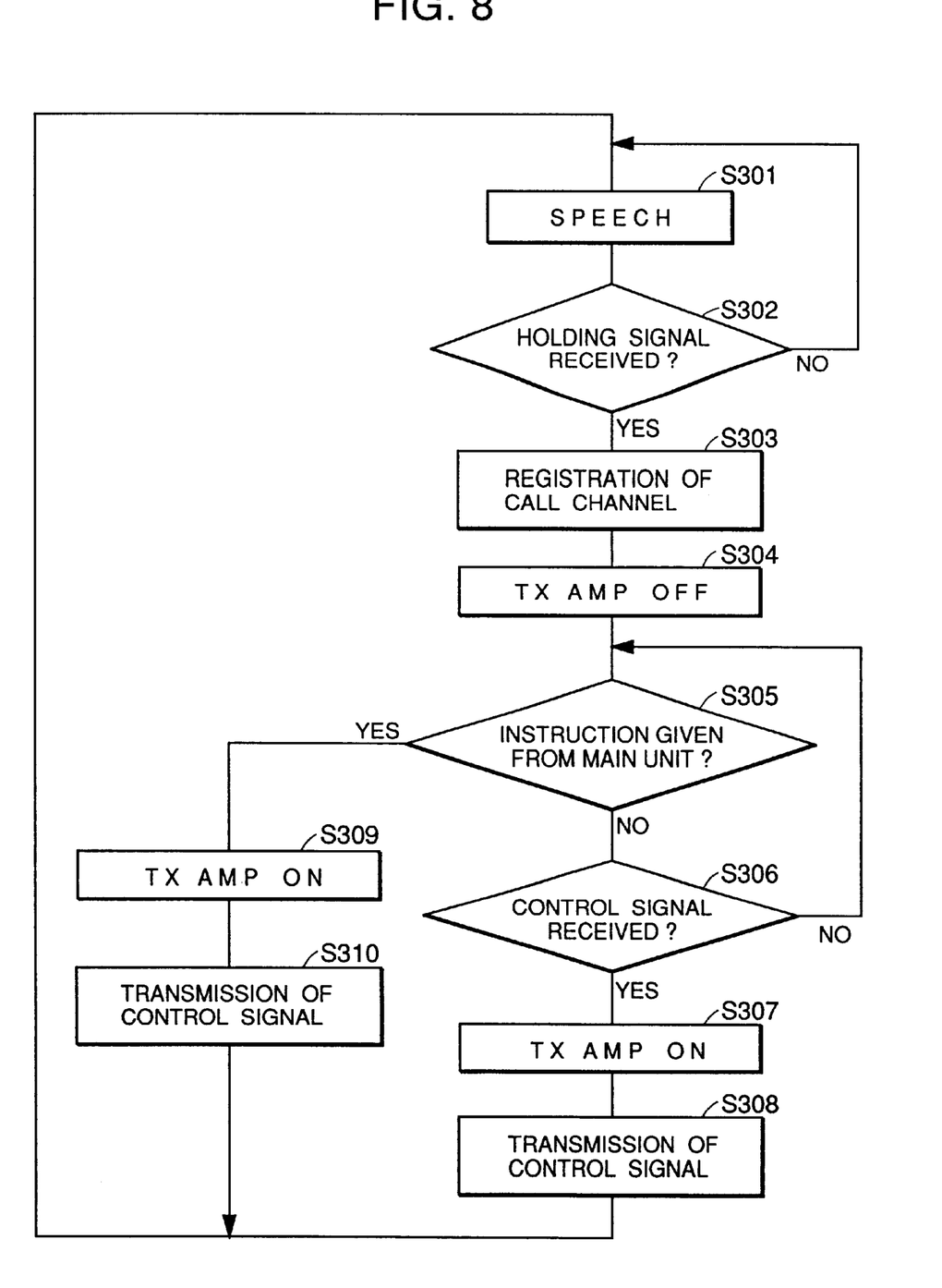
FIG. 8 is a flowchart illustrating operation of a fixed unit in accordance with the third embodiment of the present invention.

In this case, the operation of the movable unit 207 is as shown by the flowchart in FIG. 7, and the operation of the fixed unit 203 is as shown by the flowchart in FIG. 8.

In Step S201 in FIG. 7, the movable unit 207 is in the speaking state in which the movable unit 207 and the fixed unit 203 are connected by radio using the speaking channel. When the holding key on the key pad 304 of the movable unit 207 is pressed in Step S202, the CPU 301 of the movable unit 207 transmits a holding signal to the fixed unit in Step S203.

After the CPU 301 of the movable unit 207 transmits the holding signal, the CPU 301 turns off only the power for the transmission amplifier 407 and the transmission oscillator 406 in Step S204. The other sections such as the CPU 301, the receiving section 404 and so on are operated in the speaking state. In the speaking state in Step S201, the transmission channel and the speaking channel are one and the same.

In Step S205, the CPU 301 monitors key input of the movable unit. If key input is performed to release the hold or transfer operation, the flow moves to Step S209.

The CPU 301 of the movable unit 207 monitors transmission of the control signal from the fixed unit 203 in Step S206. When the CPU 301 of the movable unit 207 receives the control signal from the fixed unit 203, the power for the transmission amplifier 407 and the transmission oscillator 406 is turned on in Step S207. The CPU 301 transmits a signal responding to the control signal transmitted in Step S206 to the fixed unit 203 in Step S208, and the flow returns to the speaking state in Step S201. If the control signal indicates on-hook of the other party of the communication, the final operation is performed.

When a transfer operation is performed by the user of the movable unit 207 in Step S205, the CPU 301 turns on the power to the transmission amplifier 407 and the transmission oscillator 406 in Step S209. In Step S210, the CPU 301 of the movable unit 207 transmits the control signal such as dial data about a transfer destination or the like through the speaking channel. The flow returns to Step S201, and the speaking channel for the transfer destination is set. After on-hook, transfer is completed.

When the user of the movable unit 207 releases the holding state in Step S205, the CPU 301 turns on the power for the transmission amplifier 407 and the transmission oscillator 406 in Step S209. The CPU 301 of the movable unit 207 transmits the control signal for hold release to the fixed unit 203 in Step S210, and the flow again returns to the speaking state in Step S201.

In the speaking state in Step S301 in FIG. 8, the movable unit 207 and the fixed unit 203 are connected by radio through the speaking channel. When the fixed unit 203 receives a hold signal generated by pressing the holding key of the movable unit 207 in Step S302, the fixed unit 203 registers the speaking channel used in the speaking state in Step S301 in the memory 220 of the main unit 202 in Step S303. This registration of the speaking channel prohibits the other fixed unit in the system to use the speaking channel to secure the speaking channel in the speaking state.

After the stopping of the carrier transmitted from the movable unit 207 is recognized in Step S304, the fixed unit 203 turns off only the power for the transmission amplifier, and stops the transmission of the carrier. At this time, the receiving channel and the speaking channel are one and the same, and the other circuits of the control section and so on are operated in the same state as the speaking state in Step S301.

The transmitting/receiving section of the fixed unit is the same as that shown in FIG. 6 with the exception that power is supplied from an AC power source in place of supply from the battery.

The fixed unit 203 monitors the main unit 202 to give instructions in Step S305, and if instructions are given from the main unit 202, the flow moves to Step S309.

If no instruction is given from the main unit 202, the fixed unit 203 monitors the control signal generated by key input or the like from the movable unit 207 in Step S306. When the fixed unit 203 receives the control signal for transfer or hold release, it turns on the power for the transmission amplifier in Step S307, and transmits a signal responding to the control signal. The flow then returns to Step S301 again. In the case of transfer, the dial data received is transmitted to the main unit 202. After the speaking channel for the transfer destination is set, when on-hook of the movable unit is detected, transfer is completed. In the case of hold release, holding between the movable unit and the other party is released, and there is a return to the speaking state.

If instructions are given from the main unit 202 in Step S305, the power for the transmission amplifier is turned on in Step S309, and the fixed unit transmits the control signal to the movable unit in Step S310. Then the flow returns to the speaking state. If the instructions given from the main unit 202 indicate on-hook of the other party, after radio connection with the movable unit is established, the radio connection is cut off by the on-hook of the movable unit.

In the above third embodiment, since, in holding, the main unit 202 prohibits the fixed unit from being connected to the other extension telephone to use the speaking channel between the movable unit 207 and the fixed unit 203 in the speaking state, the speaking channel is not used by the other fixed unit in the above system. The movable unit and the fixed unit in the holding state can thus wait to receive a call signal using the speaking channel as the receiving channel in spite of the state wherein no carrier is transmitted through the speaking channel.

In holding, the movable unit 207 and the fixed unit 203 may be brought into the holding state so as to wait for receiving using the control channel as the receiving channel when the transmission of the carrier is stopped, without the main unit 202 prohibiting the fixed units connected to the other extension telephones to use the speaking channel in the speaking state.

Although the present invention is described with reference to the preferred embodiments, the present invention is not limited to the embodiments, and various modifications can be made within the range of the claims.

What is claimed is:

1. A telephone comprising:
   display means for displaying information;
   responding means for responding to an incoming call;
   detection means for detecting a speech signal to be transmitted to a calling party of the incoming call in a state where the incoming call has been responded to by said responding means; and
   restriction means for restricting power to said display means when a start of communication is recognized in response to a detection of the speech signal in a state where the incoming call has been responded to.

2. A telephone according to claim 1, wherein said display means displays information about states of external lines.

3. A telephone according to claim 1, wherein said restriction means stops display by said display means.

4. A telephone according to claim 1, further means for transmitting the signal via an antenna.

5. A telephone according to claim 1, wherein said detection means detects a transmitting signal to be transmitted from the telephone.

6. A telephone according to claim 1, wherein said restriction means restricts the power to said display means when the communication signal is detected after a control signal for a line connection is communicated.

7. A communication device comprising:
   display means for displaying information in response to an off-hook operation;
   key input means; and
   restriction means which restricts power to said display means as soon as a number of a telephone number sequence is input by said key input means through a key operation while said display means is displaying the information.

8. A communication device according to claim 7, wherein said display means displays information about states of external lines.

9. A communication device according to claim 7, wherein said restriction means controls said display means so that display is stopped when a dial number is input by a dial key of said input means.

10. A communication device according to claim 7, further comprising radio communication means.

11. A communication device according to claim 7, further comprising speech communication means.

12. A communication apparatus including a plurality of fixed units for connecting a plurality of movable units, comprising:
   transmission means for transmitting a transmitting signal and a carrier signal on one of a plurality of communication channels from a first movable unit to a first fixed unit in a case where the first movable unit is in a communication state with a communication partner via the first fixed unit; and
   restriction means for restricting use of the one of the plurality of communication channels to the first fixed unit and the communication partner in a case where the first movable unit is in a holding state and transmission of the carrier signal on the one of the plurality of communication channels from the first movable unit to the first fixed unit is stopped.

13. A communication apparatus according to claim 12, wherein said restriction means turns off power for said transmission means in response to the demand for holding.

14. A communication apparatus according to claim 12, wherein said restriction means includes receiving means for receiving a signal, and controls said receiving means so as to continue the receiving operation in the presence of the demand for holding.

15. A communication apparatus according to claim 14, wherein said restriction means selectively controls turning on and off of the power for the transmission means and the power for the receiving means.

16. A communication apparatus according to claim 14, wherein said restriction means controls said transmission means so as to resume transmission of the carrier signal when a predetermined signal is received by said receiving means.

17. A communication apparatus according to claim 12, wherein said restriction means controls said transmission means so as to resume transmission of the carrier signal on the communication channel in response to a demand for resuming a held communication.

18. A communication apparatus according to claim 12, wherein said transmission means transmits the transmitting signal and the carrier signal via an antenna.

19. A communication apparatus according to claim 12, further comprising speech communication means.

20. A communication apparatus comprising:
   display means for displaying information;
   responding means for responding to an incoming call;
   detection means for detecting a speech signal to be transmitted to a calling party of the incoming call in a state where the incoming call has been responded to by said responding means; and
   control means for controlling said display means so as to interrupt display when a start of communication is recognized in response to detection of the speech signal in a state where the incoming call has been responded to.

21. A communication apparatus according to claim 20, wherein said display means displays information about external lines.

22. A communication apparatus according to claim 20, wherein said detection means detects a transmitting speech signal.

23. A communication apparatus according to claim 20, further comprising means for transmitting the signal via an antenna.

24. A communication device comprising:
   display means for displaying information in response to an off-hook operation;
   key input means; and
   control means for controlling said display means so as to interrupt the display of the information being performed by said display means as soon as a number of a telephone sequence is input by said key input means through a key operation while said display means is displaying the information.

25. A communication device according to claim 24, wherein said display means displays information about states of external lines.

26. A communication device according to claim 24, wherein said control means controls the display means so as to interrupt display when a dial number is input by a dial key of said key input means.

27. A communication device according to claim 24, further comprising radio communication means.

28. A communication device according to claim 24, further comprising speech communication means.

29. A method of operating a communication apparatus having a display, comprising the steps of:
   displaying information on the display in response to an operation for communication;
   detecting a speech signal at the apparatus; and
   restricting power to the display which has been activated by the apparatus when a start of communication is recognized in response to the detection of the speech signal.

30. A method according to claim 29, wherein information about states of external lines is displayed on the display in said displaying step.

31. A method according to claim 29, wherein a transmitting speech signal is detected in said detecting step.

32. A method according to claim 29, wherein the display is turned off in said restricting step.

33. A method according to claim 29, further comprising a step of transmitting the signal via an antenna.

34. A method according to claim 29, wherein a transmitting signal to be transmitted from the apparatus is detected in said detecting step.

35. A method according to claim 29, wherein the power to the display is restricted after a control signal for a line connection is communicated.

36. A method of operating a communication apparatus having a display, comprising the steps of:
   displaying information on the display in response to an off-hook operation;
   detecting dialing data input through a key operation; and
   restricting power to the display as soon as a number of a telephone number sequence is detected through the key operation in said detecting step while the information is being displayed.

37. A method according to claim 36, wherein information about states of external lines is displayed on the display in said displaying step.

38. A method according to claim 36, wherein dial number data input from a dial key is detected in said detecting step.

39. A method according to claim 36, wherein the display is turned off in said restriction step.

40. A method according to claim 36, further comprising a step of communicating a radio signal.

41. A method according to claim 36, further comprising a step of communicating a speech signal.

42. A method of operating a communication system including a plurality of fixed units and a plurality of movable units, comprising the steps of:
   inhibiting transmission of a carrier signal on one of a plurality of communication channels from a first movable unit to a first fixed unit in a case where communication between the first movable unit and a communication partner is in a hold state; and
   restricting use of the one of the plurality of communication channels to the first fixed unit and the communication partner in a case where communication between the first movable unit and the communication partner is in the hold state and the transmission of the carrier signal on the one of the plurality of communication channels from the first movable unit to the first fixed unit is inhibited.

43. A method according to claim 42, wherein power for transmission is turned off in said inhibiting step.

44. A method according to claim 42, further comprising a receiving step of receiving a signal, wherein the reception in said receiving step is continued in spite of the hold demand.

45. A method according to claim 44, further comprising a resuming step of resuming the transmission of the carrier signal when a predetermined signal is received in said receiving step.

46. A method according to claim 42, further comprising a resuming step of resuming the transmission of the carrier signal on the communication channel in response to a demand for resuming a held communication.

47. A communication apparatus comprising:

display means for displaying information;

making means for making an outgoing call;

detection means for detecting a speech signal to be transmitted to a called party of the outgoing call; and control means for controlling said display means so as to interrupt display when a start of communication is recognized in response to detection of said speech signal by said detecting means.

48. A communication apparatus according to claim 47, wherein said display means displays information about external lines.

49. A communication apparatus according to claim 47, wherein said detection means detects a transmitting speech signal.

50. A communication apparatus according to claim 47, further comprising means for transmitting the signal via an antenna.

51. A communication system including a plurality of fixed units and a plurality of movable units, comprising:

inhibiting means for inhibiting transmission of a carrier signal on one of a plurality of communication channels from a first movable unit to a first fixed unit in a case where communication between the first movable unit and a communication partner is in a hold state; and restriction means for restricting use of the one of the plurality of communication channels to the first fixed unit and the communication partner in a case where communication between the first movable unit and the communication partner is in the hold state and the transmission of the carrier signal on the one of the plurality of communication channels from the first movable unit to the first fixed unit is inhibited.

52. An apparatus according to claim 51, wherein power for transmission is turned off by said inhibiting means.

53. An apparatus according to claim 51, further comprising receiving means for receiving a signal, wherein the reception by said receiving means is continued in spite of the hold demand.

54. An apparatus according to claim 53, wherein said inhibiting means resumes the transmission of the carrier signal when a predetermined signal is received.

55. An apparatus according to claim 51, wherein said inhibiting means resumes the transmission of the carrier signal on the communication channel in response to a demand for resuming a held communication.

* * * * *

UNITED STATES PATENT AND TRADEMARK OFFICE
CERTIFICATE OF CORRECTION

PATENT NO. : 6,256,517 B1
DATED : July 3, 2001
INVENTOR(S) : Kazunari Watanabe

It is certified that error appears in the above-identified patent and that said Letters Patent is hereby corrected as shown below:

Title page,
Item [56], References Cited,

"2239725" should read -- 62-239725 --;
"1248792" should read -- 1-248792 --;
"2100447" should read -- 2-100447 --;
"2155394" should read -- 2-155394 --;
"5102910" should read -- 5-102910 --; and
"5344022" should read -- 5-344022 --.

Column 1,
Line 22, "by" should be deleted, and "are" should read -- is --; and
Line 58, "till" should read -- still --.

Column 3,
Line 65, "(not 317)" should read -- (317) --.

Column 8,
Line 27, "further" should read -- further comprising --.

Signed and Sealed this

Nineteenth Day of March, 2002

Attest:

JAMES E. ROGAN
Attesting Officer    Director of the United States Patent and Trademark Office